(12) United States Patent
Liang et al.

(10) Patent No.: US 10,578,484 B2
(45) Date of Patent: Mar. 3, 2020

(54) BACKLIGHT SOURCE TESTING DEVICE AND LIGHT-ON TESTING APPARATUS

(71) Applicants: BOE TECHNOLOGY GROUP CO., LTD., Beijing (CN); ORDOS YUANSHENG OPTOELECTRONICS CO., LTD., Inner Mongolia Autonomous Region (CN)

(72) Inventors: Tuan Liang, Beijing (CN); Zhaolei Li, Beijing (CN); Shuanghui Zhao, Beijing (CN); Yuan Liu, Beijing (CN); Yubing Zhang, Beijing (CN); Gang Luo, Beijing (CN); Jun Wang, Beijing (CN); Yi Qu, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 15/512,868

(22) PCT Filed: May 13, 2016

(86) PCT No.: PCT/CN2016/082035
§ 371 (c)(1),
(2) Date: Mar. 21, 2017

(87) PCT Pub. No.: WO2017/152491
PCT Pub. Date: Sep. 14, 2017

(65) Prior Publication Data
US 2019/0063990 A1    Feb. 28, 2019

(30) Foreign Application Priority Data
Mar. 7, 2016 (CN) .......................... 2016 1 0128112

(51) Int. Cl.
*G01J 1/42* (2006.01)
*G01J 1/44* (2006.01)

(52) U.S. Cl.
CPC ............... *G01J 1/4228* (2013.01); *G01J 1/44* (2013.01); *G01J 2001/4247* (2013.01)

(58) Field of Classification Search
CPC .... G01J 1/44; G01J 1/4228; G01J 2001/4247; G01J 5/08; G02F 1/13; G02F 1/1335;
(Continued)

(56) References Cited

U.S. PATENT DOCUMENTS 7,110,062 B1 * 9/2006 Whitted ................ G02F 1/1336
349/62
2004/0246434 A1 * 12/2004 Ohashi ................. G09G 3/3406
349/199
(Continued)

FOREIGN PATENT DOCUMENTS

CN         1670587 A       9/2005
CN       101180522 A       5/2008
(Continued)

OTHER PUBLICATIONS

International Search Report and Written Opinion for Application No. PCT/CN2016/082035, dated Nov. 30, 2016, 11 Pages.
(Continued)

*Primary Examiner* — Jamil Ahmed
(74) *Attorney, Agent, or Firm* — Brooks Kushman P.C.

(57) ABSTRACT

The present disclosure provides a backlight source monitoring device and a pattern generator. The backlight source monitoring device includes a base, a fixing structure arranged on the base and configured to fix a backlight source to be monitored, a monitoring element fixed on the base and configured to monitor a brightness value of the backlight source to obtain brightness data, and a display element
(Continued)

connected with the monitoring element and configured to receive and display the brightness data obtained by the monitoring element.

13 Claims, 6 Drawing Sheets

(58) Field of Classification Search
CPC ... G09G 3/34; G09G 5/00; G09G 5/10; F21V 7/04
See application file for complete search history.

(56) References Cited

U.S. PATENT DOCUMENTS

| | | | |
|---|---|---|---|
| 2007/0030697 A1* | 2/2007 | Kim | G09G 3/342 362/618 |
| 2009/0231575 A1 | 9/2009 | Saito et al. | |
| 2010/0315594 A1* | 12/2010 | Johansson | A61B 3/0041 351/224 |
| 2011/0037787 A1 | 2/2011 | Yoshiga | |
| 2012/0019152 A1* | 1/2012 | Barnhoefer | H05B 33/0851 315/158 |
| 2014/0204314 A1 | 7/2014 | Tseng | |
| 2014/0264034 A1* | 9/2014 | Cui | G06F 3/0416 250/341.8 |

FOREIGN PATENT DOCUMENTS

| | | |
|---|---|---|
| CN | 201285345 Y | 8/2009 |
| CN | 101996595 A | 3/2011 |
| CN | 202024875 U | 11/2011 |
| CN | 102636335 A | 8/2012 |
| CN | 202869778 U | 4/2013 |
| CN | 202947859 U | 5/2013 |
| CN | 202995185 U | 6/2013 |
| CN | 103645035 A | 3/2014 |
| CN | 203719765 U | 7/2014 |
| CN | 104019961 A | 9/2014 |
| CN | 204272279 U | 4/2015 |
| CN | 104616611 A | 5/2015 |
| CN | 104698399 A | 6/2015 |
| CN | 204515306 U | 7/2015 |
| CN | 204924618 U | 12/2015 |
| WO | 2013038560 A1 | 3/2013 |

OTHER PUBLICATIONS

First Office Action for Chinese Application No. 201610128112.4, dated Jul. 31, 2017, 12 Pages.

* cited by examiner

BACKLIGHT SOURCE TESTING DEVICE AND LIGHT-ON TESTING APPARATUS

CROSS-REFERENCE TO RELATED APPLICATIONS

This application is the U.S. national phase of PCT Application No. PCT/CN2016/082035filed on May 13, 2016, which claims priority to Chinese Patent Application No. 201610128112.4filed on Mar. 7, 2016, the disclosures of which are incorporated in their entirety by reference herein.

TECHNICAL FIELD

The present disclosure relates to the field of display technology, in particular to a backlight source monitoring device and a pattern generator.

BACKGROUND

In related art, a brightness value of the backlight source of a pattern generator cannot be displayed autonomously. To monitor the brightness value of the backlight source of the pattern generator, an operator has to hold and align a brightness testing instrument with the backlight source to monitor the brightness value. Such monitoring method is complicated and cumbersome. The monitoring result may be inaccurate due to great impact of human factors.

In the related art, during a period for monitoring the brightness value of the backlight source of the pattern generator, if it tends to adjust the brightness value of the backlight source, since an adjustable switch for the backlight source is arranged within the pattern generator, as shown in FIG. 1, a substrate 2 covering the backlight source 1 has to be removed from the backlight source 1, and then, as shown in FIG. 2, a sliding rheostat RR may be adjusted, so as to adjust the brightness value of the backlight source of the pattern generator. In this way, the substrate 2 is liable to be dislocated and requires a re-alignment adjustment, thereby increasing a downtime and decreasing a utilization rate of the pattern generator.

SUMMARY

The present disclosure provides a backlight source monitoring device and a pattern generator so as to accurately monitor the brightness value of the backlight source.

According to an aspect of the present disclosure, a backlight source monitoring device is provided, which includes: a base; a fixing structure arranged on the base and configured to fix a backlight source to be monitored; a monitoring element fixed on the base and configured to monitor a brightness value of the backlight source to obtain brightness data; and a display element connected with the monitoring element and configured to receive and display the brightness data obtained by the monitoring element.

Further, the backlight source monitoring device further includes: a brightness adjusting element arranged on the base and configured to supply an adjustable driving current to the backlight source, to adjust the brightness value of the backlight source.

Further, the base includes a backlight source placement region for placing the backlight source; and the monitoring element includes at least one optical sensor arranged above the backlight source placement region.

Further, the backlight source monitoring device includes a single optical sensor arranged at a position corresponding to a center of the backlight source placement region.

Further, the backlight source monitoring device includes a plurality of optical sensors uniformly distributed over the backlight source placement region.

Further, the display element includes: a first processor configured to execute a computation operation according to brightness data of the plurality of optical sensors, to obtain an average brightness value; and a display screen connected with the first processor and configured to display the average brightness value.

Further, the base includes a backlight source placement region for placing the backlight source; and the monitoring element includes at least one light intensity monitoring pen arranged around the backlight source placement region.

Further, the backlight source monitoring device includes a plurality of light intensity monitoring pens distributed around the backlight source placement region uniformly.

Further, the display element includes: a second processor configured to execute a computation operation according to brightness data of the plurality of light intensity monitoring pens, to obtain an average brightness value; and a display screen connected with the second processor and configured to display the average brightness value.

Further, the monitoring element includes: an ammeter configured to measure a magnitude of the driving current; and an integrated chip configured to execute a computation operation according to the magnitude of the driving current, to obtain a brightness value of the backlight source, wherein the display element is connected with the integrated chip, and configured to display the brightness value obtained by the integrated chip.

Optionally, the brightness adjusting element is a knob, and a magnitude of the driving current inputted into the backlight source is capable of being changed by rotating the knob; or the brightness adjusting element is a button, and the magnitude of the driving current inputted into the backlight source is capable of being changed by moving the button in an up direction or a down direction for adjustment.

The present disclosure also provides a pattern generator, which includes the above-mentioned backlight source monitoring device and a backlight source fixed on the backlight source monitoring device.

The embodiment of the present disclosure has the following beneficial effects. In the above-mentioned solutions, in the case of monitoring the brightness value of the backlight source, the backlight source is fixed on the base, and the monitoring element capable of monitoring the brightness value of the backlight source and the display element capable of receiving and displaying the brightness data monitored by the monitoring element are integrated on the base, such that the brightness value of the backlight source may be monitored and displayed after the backlight source is fixed on the base, thereby accurately monitoring the brightness value of the backlight source in a real time manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

Figure 1:
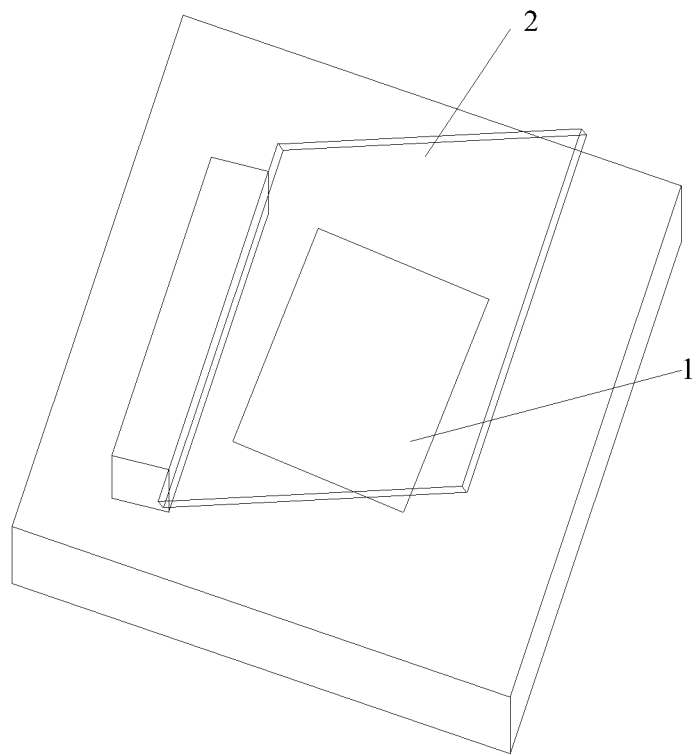
FIG. 1 is a schematic diagram of a backlight source of a pattern generator in the related art.
Figure 2:
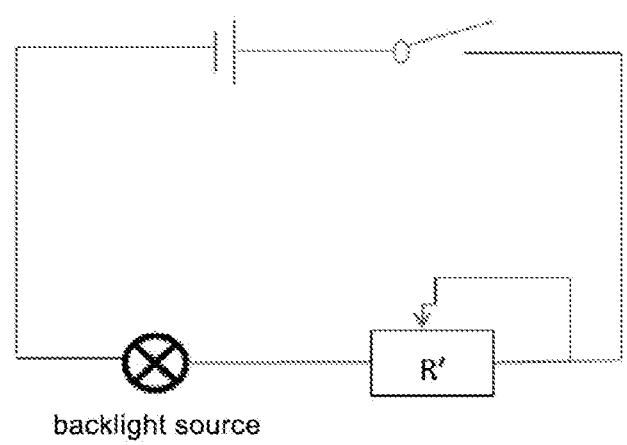
FIG. 2 is a schematic circuit diagram of a backlight source of a pattern generator in the related art.

REFERENCE NUMERALS 1 backlight source 2 substrate 3 base 4 display element
5 optical sensor 6 light intensity monitoring pen
8 display screen 9 integrated chip 10 ammeter

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In respect of the problem in the related art that during the monitoring of the brightness value of the backlight source of the pattern generator, the operations are complicated and cumbersome and the monitoring results may be inaccurate, the embodiment of the present disclosure provide a backlight source monitoring device and a pattern generator so as to accurately monitor the brightness value of the backlight source.

In at least one embodiment, a backlight source monitoring device is provided, which includes: a base; a fixing structure arranged on the base and configured to fix a backlight source to be monitored; a monitoring element fixed on the base and configured to monitor a brightness value of the backlight source to obtain brightness data; and a display element connected with the monitoring element and configured to receive and display the brightness data obtained by the monitoring element.

In the present embodiment, in the case of monitoring the brightness value of the backlight source, the backlight source is fixed onto the base, and the monitoring element capable of monitoring the brightness value of the backlight source and the display element capable of receiving and displaying the brightness data monitored by the monitoring element are integrated on the base, so that the brightness value of the backlight source may be monitored and displayed after the backlight source is fixed onto the base, thereby accurately monitoring the brightness value of the backlight source in a real time manner.

Further, the backlight source monitoring device further includes: a brightness adjusting element arranged on the base and configured to supply an adjustable driving current to the backlight source, to adjust the brightness value of the backlight source. As a result, it is capable of adjusting the brightness value of the backlight source without removing the substrate covering the backlight source from the backlight source.

Further, the base includes a backlight source placement region for placing the backlight source; and the monitoring element includes at least one optical sensor arranged above the backlight source placement region and configured to monitor the brightness value of the backlight source.

In a specific embodiment, the backlight source monitoring device includes a single optical sensor arranged at a position corresponding to a center of the backlight source placement region.

In another specific embodiment, the backlight source monitoring device includes a plurality of optical sensors distributed over the backlight source placement region uniformly.

Further, when the monitoring element includes a plurality of optical sensors, the display element includes: a first processor configured to execute a computation operation according to brightness data of the plurality of optical sensors, to obtain an average brightness value; and a display screen connected with the first processor and configured to display the average brightness value.

Further, the base includes a backlight source placement region configured to place the backlight source, and the monitoring element includes at least one light intensity monitoring pen arranged around the backlight source placement region and configured to monitor the brightness value of the backlight source.

In a specific embodiment, the backlight source monitoring device includes a plurality of light intensity monitoring pens distributed around the backlight source placement region uniformly.

Further, when the monitoring element includes a plurality of light intensity monitoring pens, the display element includes: a second processor configured to execute a computation operation according to brightness data of the plurality of light intensity monitoring pens, to obtain an average brightness value; and a display screen connected with the second processor and configured to display the average brightness value.

Further, the monitoring element includes: an ammeter configured to measure a magnitude of the driving current; and an integrated chip configured to execute a computation operation according to the magnitude of the driving current, to obtain a brightness value of the backlight source, wherein the display element is connected with the integrated chip, and configured to display the brightness value obtained by the integrated chip. In this way, the magnitude of the drive current of the backlight source is measured by the ammeter, so as to compute the brightness value of the backlight source.

In at least one embodiment, a pattern generator is also provided, which includes the above-mentioned backlight source monitoring device and a backlight source fixed on the backlight source monitoring device.

In the present embodiment, in the case of monitoring the brightness value of the backlight source, the backlight source is fixed on the base, and the monitoring element capable of monitoring the brightness value of the backlight source and the display element capable of receiving and displaying the brightness data monitored by the monitoring element are integrated on the base, such that the brightness value of the backlight source may be monitored and displayed after the backlight source is fixed on the base, thereby accurately monitoring the brightness value of the backlight source in a real time manner.

Figure 3:
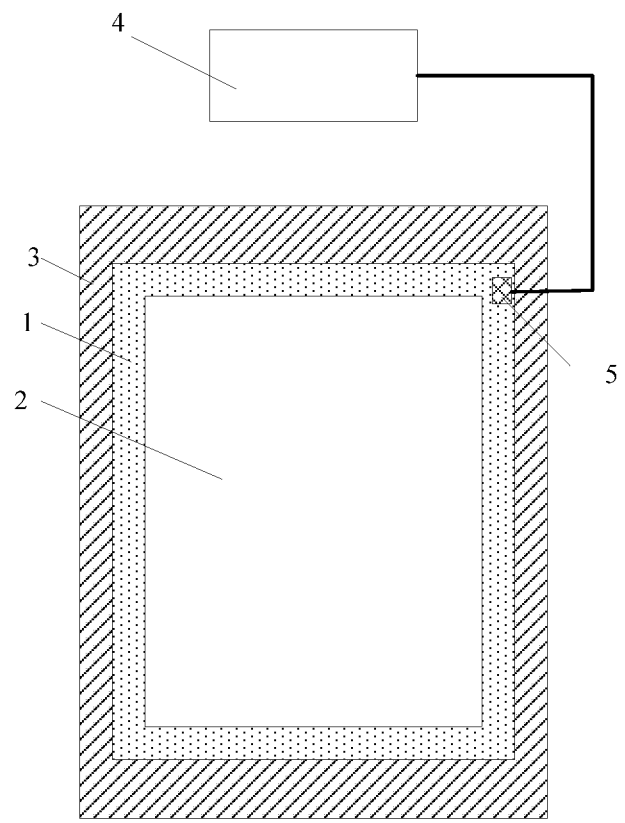
FIGS. 3-4 are schematic diagrams of a backlight source monitoring device according to at least one embodiment of the present disclosure.
Figure 4:
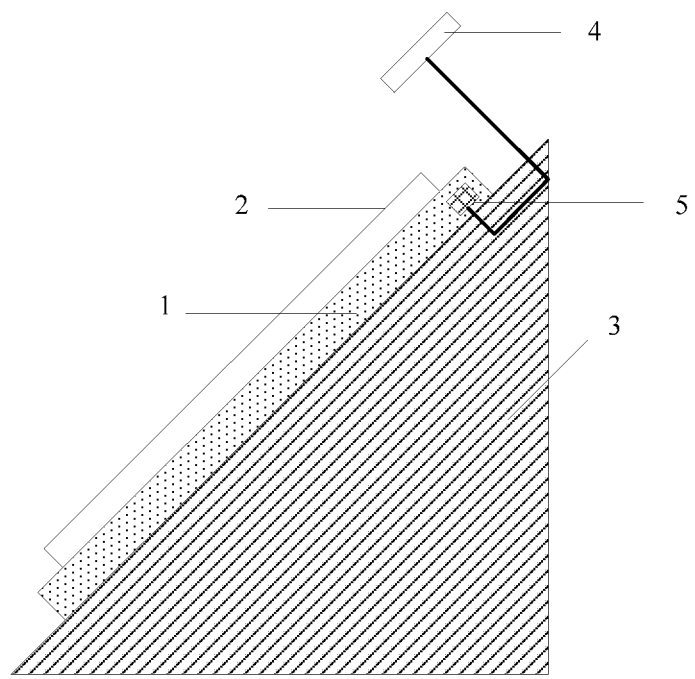

In at least some embodiments, as shown in FIGS. 3-4, the backlight source monitoring device includes: a base 3, and a fixing structure arranged on the base 3 and capable of fixing the backlight source 1 on the backlight source placement region of the base 3. The backlight source 1 is covered by a transparent substrate 2 capable of protecting the backlight source 1. The backlight source monitoring device further includes a brightness adjusting element arranged on the base 3 and capable of supplying an adjustable driving current to the backlight source 1, so as to adjust the brightness value of the backlight source 1. As a result, it enables to adjust the brightness value of the backlight source 1 without removing the substrate 2 covering the backlight source 1 from the backlight source 1. Specifically, the brightness adjusting element may be a knob, and a magnitude of the driving current inputted into the backlight source is capable of being changed by rotating the knob, so as to adjust the brightness value of the backlight source. Alternatively, the brightness adjusting element may be a button, and the magnitude of the driving current inputted into the backlight source is capable of being changed by moving the button in an up direction or a down direction for adjustment, so as to adjust the brightness value of the backlight source.

In the embodiments of the present disclosure, the backlight source monitoring device may further include a display element 4 and a plurality of optical sensors 5 distributed over the backlight source placement region and capable of monitoring the brightness value of the backlight source 1. Optionally, the plurality of optical sensors 5 is uniformly distributed over the backlight source placement region. The display element 4 includes a first processor and a display screen. The first processor is connected with the plurality of optical sensors, receives the brightness data monitored by the plurality of optical sensors and computes the received brightness data of the plurality of optical sensors to obtain an average brightness value. The display screen displays the average brightness value computed by the first processor.

In the embodiments of the present disclosure, since a plurality of optical sensors is uniformly distributed over the backlight source placement region, the backlight source brightness of a plurality of regions may be obtained, and an average brightness value of the backlight source capable of accurately representing the brightness value of the backlight source may be computed based on the plurality of brightness values.

In the embodiments of the present disclosure, in the case of monitoring the brightness value of the backlight source using the backlight source monitoring device, the magnitude of the driving current inputted into the backlight source may be adjusted through the brightness adjusting element, the brightness value of the backlight source is monitored through the optical sensor and the display screen displays the brightness value of the backlight source, thereby realizing a digitalization and monitoring of the brightness value of the backlight source, so as to accurately monitor the brightness value of the backlight source in a real time manner.

During a lighting-on detection, in the case that a change occurs in the brightness value of the backlight source due to an external factor, the brightness value of the backlight source may be adjusted and monitored by the backlight source monitoring device, so that the brightness value of the backlight source may be kept at a certain value, and the accuracy and consistency of the image is maintained in the lighting-on detection. According to the technical solution of the present embodiment, the errors due to human factors may be avoided and the brightness value of the backlight source can be accurately monitored, thereby reducing the downtime for adjusting the brightness value of the backlight source of the pattern generator, and reducing the dislocation risks of the pattern generator in the case of debugging equipments.

Figure 5:
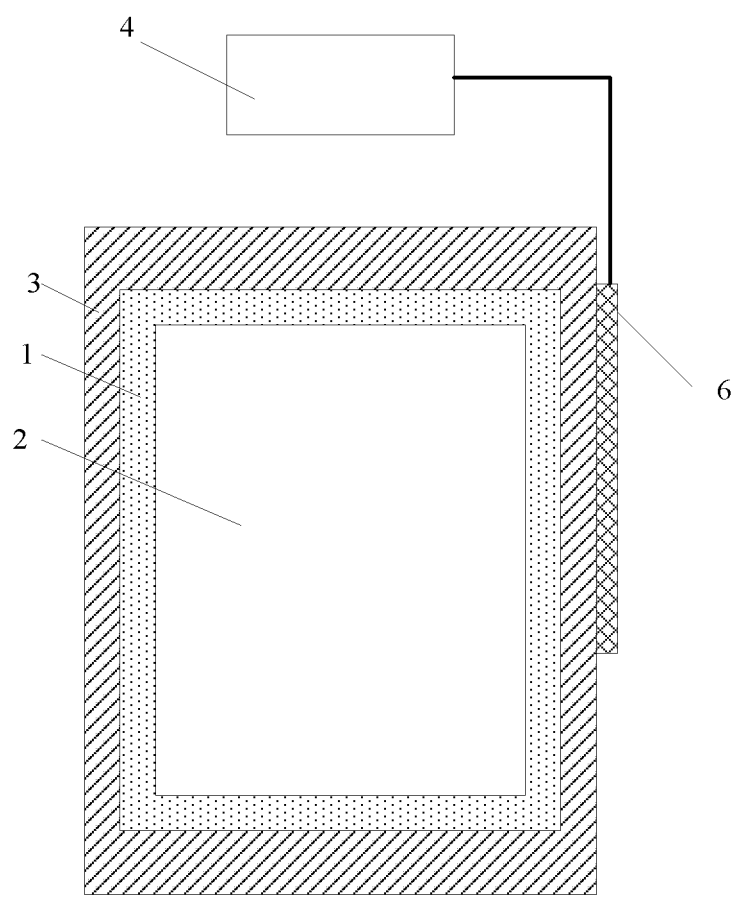
FIGS. 5-6 are schematic diagrams of another backlight source monitoring device according to at least one embodiment of the present disclosure.
Figure 6:
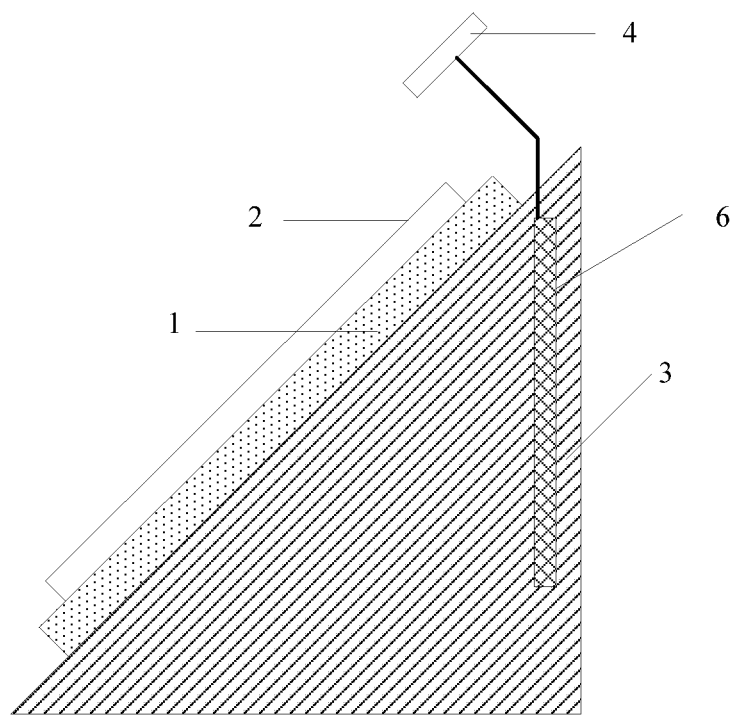

In at least some embodiments, as shown in FIGS. 5-6, the backlight source monitoring device includes a base 3 and a fixing structure arranged on the base 3 and capable of fixing the backlight source 1 on the backlight source placement region of the base 3. The backlight source 1 is covered by a transparent substrate 2 capable of protecting the backlight source 1. The backlight source monitoring device further includes a brightness adjusting element arranged on the base 3 and being capable of supplying an adjustable driving current to the backlight source 1 so as to adjust the brightness value of the backlight source 1. As a result, it enables to adjust the brightness value of the backlight source 1 without removing the substrate 2 covering the backlight source 1 from the backlight source 1. Specifically, the brightness adjusting element may be a knob, and a magnitude of the driving current inputted into the backlight source is capable of being changed by rotating the knob, so as to adjust the brightness value of the backlight source. Alternatively, the brightness adjusting element is a button, and the magnitude of the driving current inputted into the backlight source is capable of being changed by moving the button in an up direction or a down direction for adjustment, so as to adjust the brightness value of the backlight source.

In the embodiments of the present disclosure, the backlight source monitoring device may further include a display element 4 and a plurality of light intensity monitoring pens 6 which arranged around the backlight source placement region. The light intensity monitor pens 6 are capable of monitoring the brightness value of the backlight source 1. Optionally, the plurality of light intensity monitoring pens 6 are uniformly distributed around the backlight source placement region. The display element 4 includes a second processor and a display screen. The second processor is connected with the plurality of light intensity monitoring pens, receives the brightness data monitored by the plurality of light intensity monitoring pens and computes the received brightness data of the plurality of light intensity monitoring pens to obtain an average brightness value. The display screen displays the average brightness value computed by the second processor.

In the embodiments of the present disclosure, since a plurality of light intensity monitoring pens is uniformly distributed over the backlight source placement region, the backlight source brightness of a plurality of regions may be obtained and an average brightness value of the backlight source capable of accurately representing the brightness value of the backlight source may be computed based on the plurality of brightness values.

In the embodiments of the present disclosure, in the case of monitoring the brightness value of the backlight source using the backlight source monitoring device, the magnitude of the driving current inputted into the backlight source may be adjusted through the brightness adjusting element, the brightness value of the backlight source is monitored through the light intensity monitoring pens and the display screen displays the brightness value of the backlight source, thereby realizing the digitalization and monitoring of the brightness value of the backlight source, so as to accurately monitor the brightness value of the backlight source in a real time manner.

During a lighting-on detection, in the case that a change occurs in the brightness value of the backlight source due to an external factor, the brightness value of the backlight source may be adjusted and monitored by the backlight source monitoring device, so that the brightness value of the backlight source may be kept at a certain value, and the accuracy and consistency of the image is maintained in the lighting-on detection. According to the technical solution of the present embodiment, the errors due to human factors may be avoided and the brightness value of the backlight source can be accurately monitored, thereby reducing the downtime for adjusting the brightness value of the backlight source of the pattern generator, and reducing the dislocation risks of the pattern generator in the case of debugging equipments.

Figure 7:
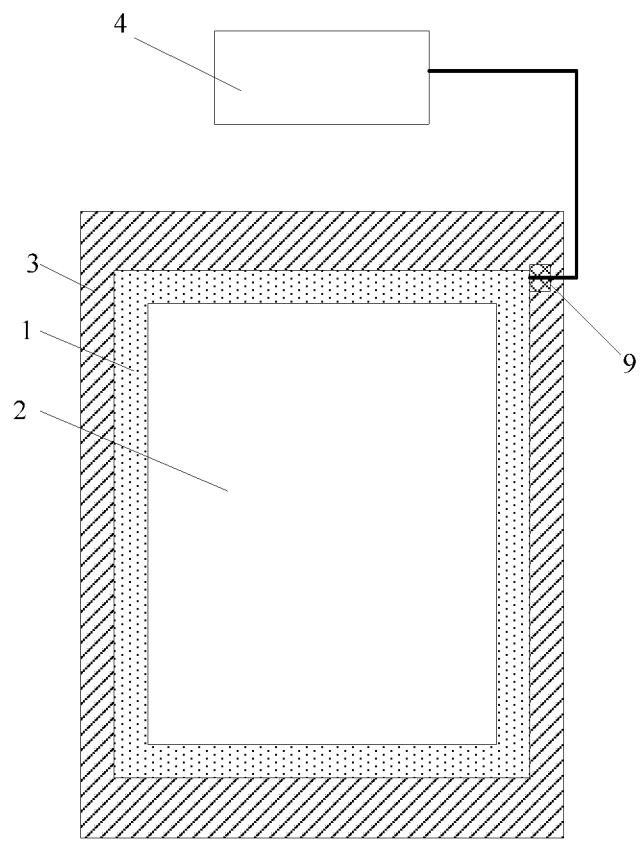
FIGS. 7-8 are schematic diagrams of yet another backlight source monitoring device according to at least one embodiment of the present disclosure.
Figure 8:
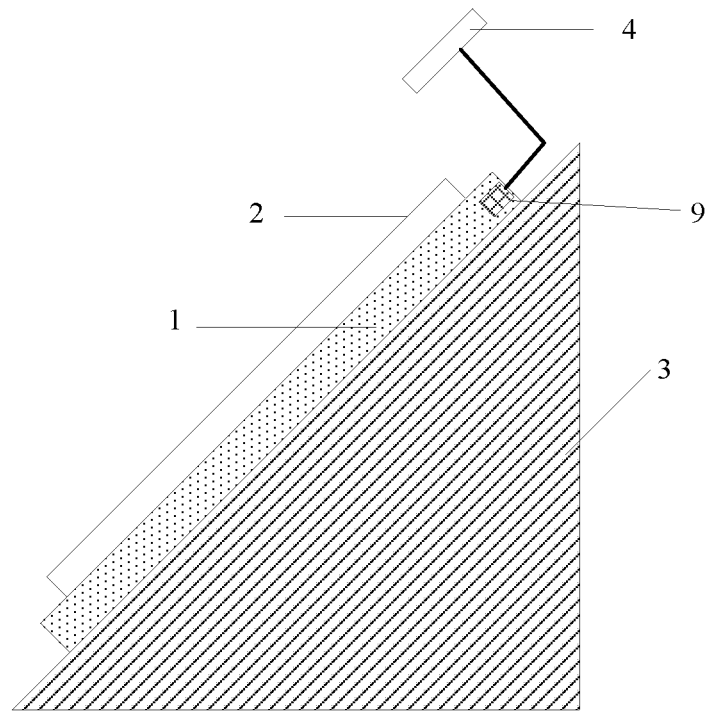

In at least some embodiments, as shown in FIGS. 7-8, the backlight source monitoring device includes a base 3 and a fixing structure arranged on the base 3 and capable of fixing the backlight source 1 on the backlight source placement region of the base 3. The backlight source 1 is covered by a transparent substrate 2 capable of protecting the backlight source 1. The backlight source monitoring device further includes a brightness adjusting element arranged on the base 3 and capable of supplying an adjustable driving current to the backlight source 1 so as to adjust the brightness value of the backlight source 1. As a result, it enables to adjust the brightness value of the backlight source 1 without removing the substrate 2 covering the backlight source 1 from the backlight source 1. Specifically, the brightness adjusting element may be a knob, and a magnitude of the driving current inputted into the backlight source is capable of being changed by rotating the knob, so as to adjust the brightness value of the backlight source. Alternatively, the brightness adjusting element may be a button, and the magnitude of the driving current inputted into the backlight source is capable of being changed by moving the button in an up direction or a down direction for adjustment, so as to adjust the brightness value of the backlight source.

In the embodiments of the present disclosure, the backlight source monitoring device further includes a monitoring element and a display element 4. The monitoring element includes an ammeter 10 capable of measuring the magnitude of the driving current of the backlight source and an integrated chip capable of computing the brightness value of the backlight source based on the magnitude of the driving current. The display element 4 includes a display screen 8, which is connected with the integrated chip 9 and configured to display the brightness value computed by the integrated chip 9.

Figure 9:
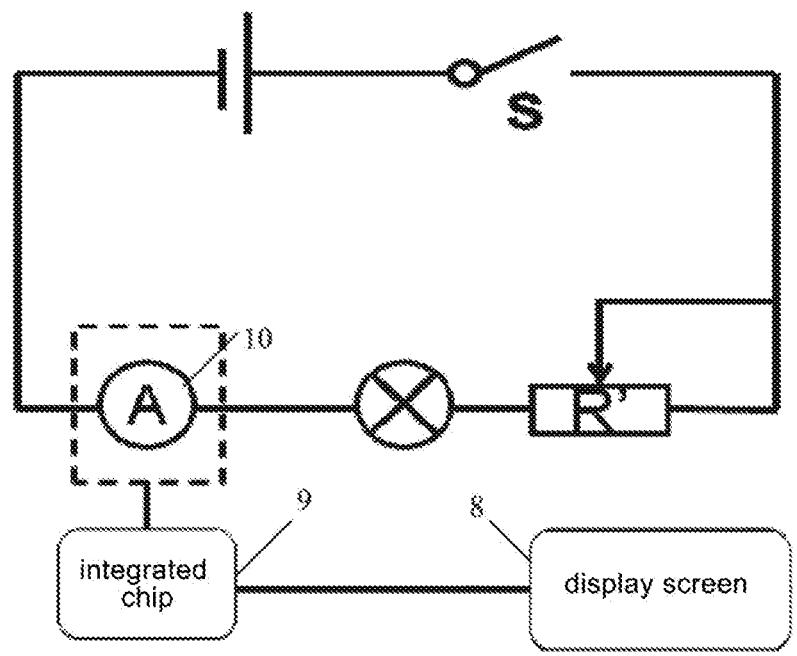
FIG. 9 is a schematic circuit diagram of another backlight source monitoring device according to at least one embodiment of the present disclosure.

FIG. 9 is a schematic circuit diagram of a backlight source monitoring device of the present embodiment. As shown in FIG. 9, a resistance of the backlight source is R, a resistance of the slide rheostat is R', the power voltage is U, and thus the current intensity I passing through the backlight source is $$I=U/(R+R') \text{ mA}.$$

Figure 10:
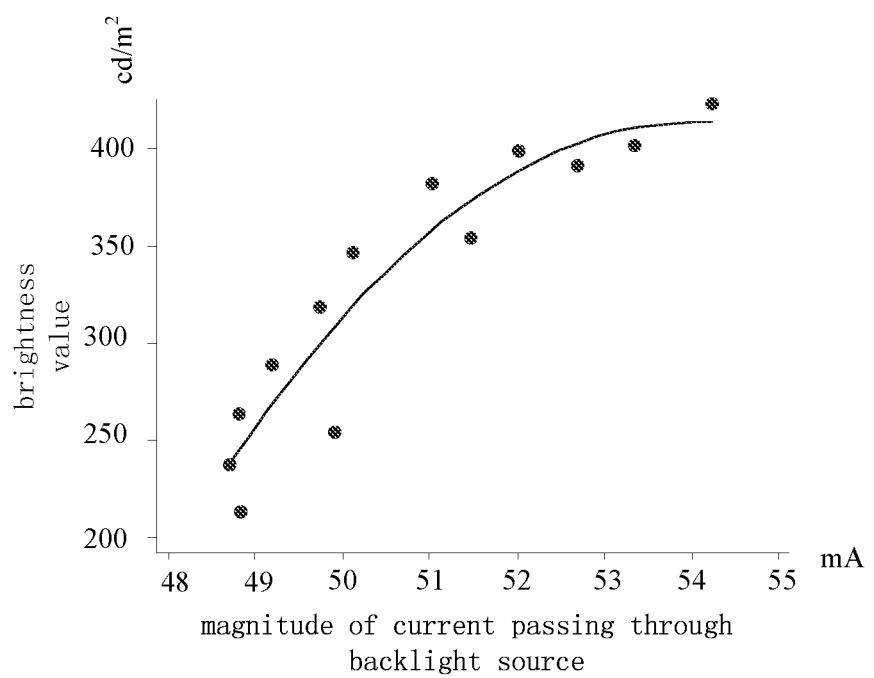
FIG. 10 is a curve fitting chart of brightness values of the backlight source of the pattern generator versus current passing through the backlight source.

FIG. 10 is a curve fitting chart of brightness values of the backlight source of the pattern generator versus current passing through the backlight source. It can be seen that, based on the conversion relation between the current of the backlight source and the brightness value of the backlight source, the brightness value of the backlight source may be computed according to the following equation:

$$B = -6.209 * I^2 + 671.3 * I - 17738 \text{ cd/m}^2.$$

The conversion equation between the current and the brightness value may be wrote into the integrated chip 9 by means of programs, and thus when the ammeter 10 measures the intensity I of the current passing through the backlight source, the integrated chip 9 may compute the brightness value of the backlight source and the display screen 8 may display the brightness value of the backlight source.

In the embodiments of the present disclosure, in the case of monitoring the brightness value of the backlight source using the backlight source monitoring device, the magnitude of the driving current inputted into the backlight source may be adjusted through the brightness adjusting element, the brightness value of the backlight source is monitored through the light intensity monitoring pens and the display screen displays the brightness value of the backlight source, thereby realizing the digitalization and monitoring of the brightness value of the backlight source, so as to accurately monitor the brightness value of the backlight source in a real time manner.

If the integrated chip (controlled by programs therein) is used, the light intensity conversion equation is written into the integrated chip by means of programs.

During a lighting-on detection, in the case that a change occurs in the brightness value of the backlight source due to an external factor, the brightness value of the backlight source may be adjusted and monitored by the backlight source monitoring device, so that the brightness value of the backlight source may be kept at a certain value, and the accuracy and consistency of the image is maintained in the lighting-on detection. According to the technical solution of the present embodiment, the errors due to human factors may be avoided and the brightness value of the backlight source can be accurately monitored, thereby reducing the downtime for adjusting the brightness value of the backlight source of the pattern generator, and reducing the dislocation risks of the pattern generator in the case of debugging equipments.

The above are merely the optional embodiments of the present disclosure. A person skilled in the art may make further modifications and improvements without departing from the principle of the present disclosure, and these modifications and improvements shall also fall within the scope of the present disclosure.

What is claimed is:

1. A backlight source testing device, comprising:
   a base comprising a backlight source placement region for placing the backlight source, wherein a plurality of optical sensors is distributed over the backlight source placement region uniformly;
a fixture arranged on the base and configured to fix a backlight source to be tested;
a brightness measuring circuit fixed on the base and configured to measure a brightness value of the backlight source to obtain brightness data, wherein the brightness measuring circuit comprises at least one optical sensor arranged above the backlight source placement region; and
a display connected with the brightness measuring circuit and configured to receive and display the brightness data obtained by the brightness measuring circuit, wherein the display comprises a processor configured to execute a computation operation according to brightness data of the plurality of optical sensors to obtain an average brightness value, and a display screen connected with the processor and configured to display the average brightness value.

2. The backlight source testing device according to claim 1, further comprising:
a driving current adjustor arranged on the base and configured to adjust a driving current supplied to the backlight source.

3. The backlight source testing device according to claim 1, wherein
the backlight source testing device comprises a single optical sensor arranged at a position corresponding to a center of the backlight source placement region.

4. A backlight source testing device, comprising:
a base comprising a backlight source placement region for placing the backlight source, wherein a plurality of light intensity monitoring pens is distributed around the backlight source placement region uniformly; and
a fixture arranged on the base and configured to fix a backlight source to be tested;
a brightness measuring circuit fixed on the base and configured to measure a brightness value of the backlight source to obtain brightness data, wherein the brightness measuring circuit comprises at least one light intensity monitoring pen arranged around the backlight source placement region, and
a display connected with the brightness measuring circuit and configured to receive and display the brightness data obtained by the brightness measuring circuit, wherein the display comprises a processor configured to execute a computation operation according to brightness data of the plurality of light intensity monitoring pens to obtain an average brightness value, and a display screen connected with the processor and configured to display the average brightness value.

5. The backlight source testing device according to claim 2, wherein the brightness measuring circuit comprises:
an ammeter configured to measure a magnitude of the driving current; and
a calculating circuit configured to execute a computation operation according to the magnitude of the driving current, to obtain the brightness value of the backlight source,
wherein the display is connected with the calculating circuit, and configured to display the brightness value obtained by the calculating circuit.

6. The backlight source testing device according to claim 2, wherein
the driving current adjustor is a knob, and a magnitude of the driving current input into the backlight source is adjustable by rotating the knob; or
the driving current adjustor is a button, and the magnitude of the driving current input into the backlight source is adjustable by moving the button in an up direction or a down direction for adjustment.

7. The backlight source testing device according to claim 4, wherein
the light intensity detecting pen is arranged within the base.

8. The backlight source testing device according to claim 4, wherein
the light intensity detecting pen is arranged out of the base and in contact with the base.

9. The backlight source testing device according to claim 1, wherein
a surface of the base that is in contact with the backlight source is tilted.

10. A light-on testing apparatus, comprising:
the backlight source testing device according to claim 1; and
a backlight source fixed on the backlight source testing device.

11. A light-on testing apparatus, comprising:
the backlight source testing device according to claim 4; and
a backlight source fixed on the backlight source testing device.

12. The light-on testing apparatus according to claim 10, wherein the backlight source testing device further comprises:
a driving current adjustor arranged on the base and configured to supply an adjustable driving current to the backlight source, to adjust the brightness value of the backlight source.

13. The light-on testing apparatus according to claim 10, wherein the backlight source testing device comprises a single optical sensor arranged at a position corresponding to a center of the backlight source placement region.

* * * * *